US012593004B2

(12) United States Patent
 Ano

(10) Patent No.: US 12,593,004 B2
(45) Date of Patent: Mar. 31, 2026

(54) DISPLAY METHOD, DISPLAY SYSTEM, AND NON-TRANSITORY COMPUTER-READABLE STORAGE MEDIUM STORING PROGRAM

(71) Applicant: SEIKO EPSON CORPORATION, Tokyo (JP)

(72) Inventor: Takahiro Ano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 261 days.

(21) Appl. No.: 18/124,682

(22) Filed: Mar. 22, 2023

(65) Prior Publication Data

US 2023/0308600 A1 Sep. 28, 2023

(30) Foreign Application Priority Data

Mar. 23, 2022 (JP) ................................. 2022-046486

(51) Int. Cl.
 *H04N 5/262* (2006.01)
 *G10L 25/57* (2013.01)
(52) U.S. Cl.
 CPC ........... *H04N 5/2628* (2013.01); *G10L 25/57* (2013.01); *H04N 5/2624* (2013.01)
(58) Field of Classification Search
 CPC .... H04N 5/2628; H04N 5/2624; H04N 7/144; H04N 7/147; H04N 9/3185; H04N 7/152; H04N 9/3179; G10L 25/57; G06T 7/70
 (Continued)

(56) References Cited

U.S. PATENT DOCUMENTS 10,554,921 B1 * 2/2020 Lim ........................ G06V 40/18
12,177,597 B2 * 12/2024 Thomasian ............... G06T 7/73
 (Continued)

FOREIGN PATENT DOCUMENTS

JP 2002-049367 A 2/2002
JP 2006-522559 A 9/2006
 (Continued)

OTHER PUBLICATIONS

Wagishi, Yuki, "Cutting-Edge Technologies for Video Conferencing", Jan. 15, 2019.
 (Continued)

*Primary Examiner* — Duc Nguyen
*Assistant Examiner* — Carissa A Jones
(74) *Attorney, Agent, or Firm* — OLIFF PLC

(57) ABSTRACT

A display method including obtaining information representing position on display surface of camera which is arranged on display surface to image first user, displaying first image related to an utterance by first user, and a second image which represents second user, the second image being arranged at position closer to position of the camera than a position of the first image is to the position of the camera, on the display surface during a period in which the second user makes an utterance, transmitting an image obtained by the camera during the period in which the second user makes the utterance, to a terminal device used by the second user, and displaying, on the display surface during a period in which the first user makes an utterance, the first image larger than the first image during the period in which the second user makes the utterance and the second image.

8 Claims, 7 Drawing Sheets

(58) Field of Classification Search
USPC ......... 348/14.12, 14.03, 14.02, 14.08, 14.09, 348/14.1, 14.77, 14.78
See application file for complete search history.

(56) References Cited

U.S. PATENT DOCUMENTS

| 2004/0239755 | A1* | 12/2004 | Kjesbu | .................. | H04N 7/144 |
| | | | | | 348/14.07 |
| 2009/0278913 | A1 | 11/2009 | Rosenfeld et al. | | |
| 2012/0287223 | A1* | 11/2012 | Zhang | .................. | H04N 7/144 |
| | | | | | 348/E7.083 |
| 2015/0244981 | A1* | 8/2015 | Johnson | ........... | H04N 21/42203 |
| | | | | | 348/14.07 |
| 2017/0280098 | A1* | 9/2017 | Sethuraman | ........ | H04L 12/1827 |
| 2021/0368134 | A1* | 11/2021 | Rajamani | .............. | G06F 16/345 |
| 2022/0368835 | A1* | 11/2022 | Shen | ....................... | H04N 23/54 |
| 2023/0188680 | A1* | 6/2023 | Files | .................. | H04N 23/531 |
| | | | | | 348/207.1 |

FOREIGN PATENT DOCUMENTS

| JP | 2010-114768 | A | 5/2010 |
| JP | 2011-520400 | A | 7/2011 |
| JP | 2021-176212 | A | 11/2021 |

OTHER PUBLICATIONS

"Premium WEB Camera VB130 for Small Conference Rooms", AVer Information Inc.

Kihachi, "Xiaomi Introduces Its Next-Generation Under-Display Camera Technology", 2019.

Ashley, "Let's use the "Spotlight" feature to pin your video for every "Microsoft Teams" user to see!", A Teams Meeting with Microsoft 365, Oct. 12, 2020.

* cited by examiner

DISPLAY METHOD, DISPLAY SYSTEM, AND NON-TRANSITORY COMPUTER-READABLE STORAGE MEDIUM STORING PROGRAM

The present application is based on, and claims priority from JP Application Serial Number 2022-046486, filed Mar. 23, 2022, the disclosure of which is hereby incorporated by reference herein in its entirety.

BACKGROUND

1. Technical Field

The present disclosure relates to a display method, a display system, and a non-transitory computer-readable storage medium storing a program.

2. Related Art

In the past, there has been spread a technology of connecting sites distant from each other with a network, and transmitting/receiving images and sounds of people located in the respective sites to thereby achieve communication. For example, a communication conference system described in JP-A-2002-49367 (Document 1) projects a picture of a conference room of a counterpart on a screen arranged in a conference room with a video projection device. In a substantially central portion of the screen, there is disposed an opening, and at a reverse surface side of this opening, there is arranged a video camera. Further, a picture taken by the video camera is transmitted to the counterpart. The video projection device always projects a black image in a portion of the opening to thereby prevent projection light emitted by the video projection device from entering the video camera.

When the camera is arranged so as to overlap the screen as in the system in Document 1 described above, the visibility of the portion overlapping the camera out of the image to be displayed deteriorates. On the other hand, depending on the content of the image, it is not necessarily preferable to display the image while avoiding the camera. In Document 1 described above, a layout of the projection image corresponding to the content of the image is not considered, and there is room for improvement.

SUMMARY

A display method according to an aspect of the present disclosure includes obtaining information representing a position on a display surface of a camera which is arranged on the display surface to image a first user, displaying a first image related to an utterance by the first user, and a second image which represents a second user, and which is arranged at a position closer to the position of the camera on the display surface than a position of the first image, on the display surface during a period in which the second user makes an utterance, transmitting an image obtained by the camera during the period in which the second user makes the utterance, to a terminal device used by the second user, and displaying the second image and the first image larger in size than the first image during the period in which the second user makes the utterance, on the display surface during a period in which the first user makes an utterance.

A display system according to an aspect of the present disclosure includes at least one communication interface configured to communicate with a camera which is arranged on a display surface and which images a first user, and a terminal device of a second user, a display device configured to display an image on the display surface, a speaker, and at least one processing device configured to control the communication interface, the display device, and the speaker, wherein the at least one processing device obtains information representing a position of the camera on the display surface, displays a first image related to an utterance by the first user, and a second image which represents the second user, and which is arranged at a position closer to the position of the camera on the display surface than a position of the first image, on the display surface, with the display device, during a period in which the second user makes an utterance, transmits an image obtained by the camera during the period in which the second user makes the utterance, to the terminal device used by the second user via the communication interface, and displays the second image and the first image larger in size than the first image during the period in which the second user makes the utterance, on the display surface, with the display device, during a period in which the first user makes an utterance.

In a non-transitory computer-readable storage medium storing a program according to an aspect of the present disclosure, the program makes a computer execute a method including obtaining information representing a position on a display surface of a camera which is arranged on the display surface to image a first user, displaying a first image related to an utterance by the first user, and a second image which represents a second user, and which is arranged at a position closer to the position of the camera on the display surface than a position of the first image, on the display surface during a period in which the second user makes an utterance, transmitting an image obtained by the camera during the period in which the second user makes the utterance, to a terminal device used by the second user, and displaying the second image and the first image larger in size than the first image during the period in which the second user makes the utterance, on the display surface during a period in which the first user makes an utterance.

DESCRIPTION OF AN EXEMPLARY EMBODIMENT

Figure 1:
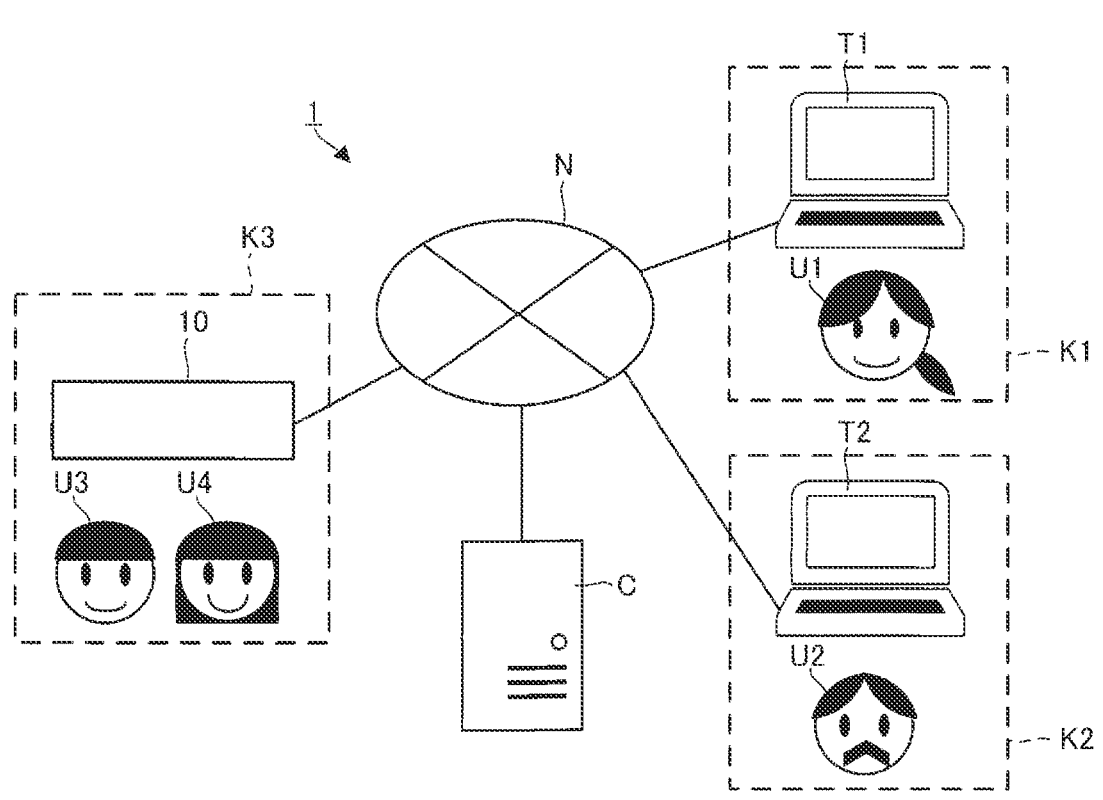
FIG. 1 is a diagram schematically showing a conference system 1 including a display system 10 according to an embodiment.

A preferred embodiment related to the present disclosure will hereinafter be described with reference to the accompanying drawings. It should be noted that in the drawings, dimensions or scale sizes of each section are arbitrarily different from the reality, and some portions are shown schematically in order to make understanding easy. Further, the scope or the spirit of the present disclosure is not limited to the embodiment unless there is a particular description of limiting the present disclosure in the following explanation.

A: Outline of Display System 10

FIG. 1 is a diagram schematically showing a conference system 1 including a display system 10 according to the embodiment. The conference system 1 is a system for performing an online conference at which users U1 through U4 located in respective sites K1 through K3 attend. The conference system 1 includes the display system 10, terminal devices T1, T2, and a conference server C. The terminal devices T1, T2 are each an information processing device provided with a communication function such as a personal computer, a tablet terminal, or a smartphone.

The display system 10, the terminal devices T1, T2, and the conference server C are connected to each other via a network N. The terminal device T1 is arranged in the site K1. At the site K1, there is located the user U1. The terminal device T2 is arranged in the site K2. At the site K2, there is located the user U2. The display system 10 is arranged in the site K3. At the site K3, there are located the users U3 and U4. The user U3 is an example of a first user, and the user U1 is an example of a second user.

The online conference is performed using, for example, an online conference application. The online conference application is executed in the terminal devices T1, T2, and a personal computer 20 of the display system 10 shown in FIG. 2. When, for example, the user U1 requests to hold a conference on the online conference application, the conference server C is notified of an opening request of the conference. The conference server C issues a URL (Uniform Resource Locator) in accordance with the opening request. The URL corresponds to identification information of the conference room virtually disposed on the conference server C. The user U1 stores the URL thus issued in the terminal device T1. Further, the user U1 notifies the users U2 through U4 of the URL with e-mail or the like.

When the scheduled time of the conference comes, in the terminal devices T1, T2 and the personal computer 20, the online conference application is invoked to be connected to a connection destination represented by the URL. The online conference application transmits image data taken at the own site and sound data collected at the own site to the conference server C. Further, the online conference application transmits data which is instructed to be shared in the own site to the conference server C. The data to be shared in the online conference is hereinafter referred to as "shared data." In the present embodiment, it is assumed that the shared data is data a content of which becomes identifiable for the users U1 through U4 by displaying the data using the projector 30 or a display. Further, the online conference application receives the image data taken at another site, the sound data collected at another site, and the shared data shared with another site from the conference server C, and then outputs an image and a sound based on these data. Thus, there is realized the online conference using images and sounds among the sites K1 through K3.

B: Details of Display System 10

Figure 2:
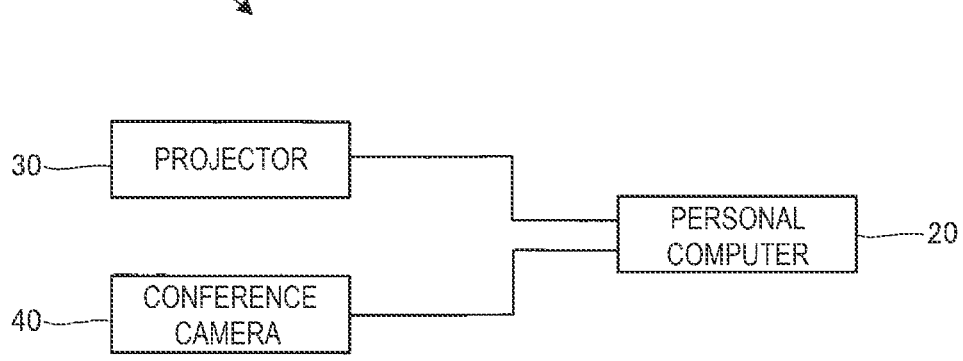
FIG. 2 is a block diagram showing a configuration of the display system 10.

FIG. 2 is a block diagram showing a configuration of the display system 10. The display system 10 is provided with a personal computer 20, a projector 30, and a conference camera 40.

B-1: Configuration of Personal Computer 20

Figure 3:
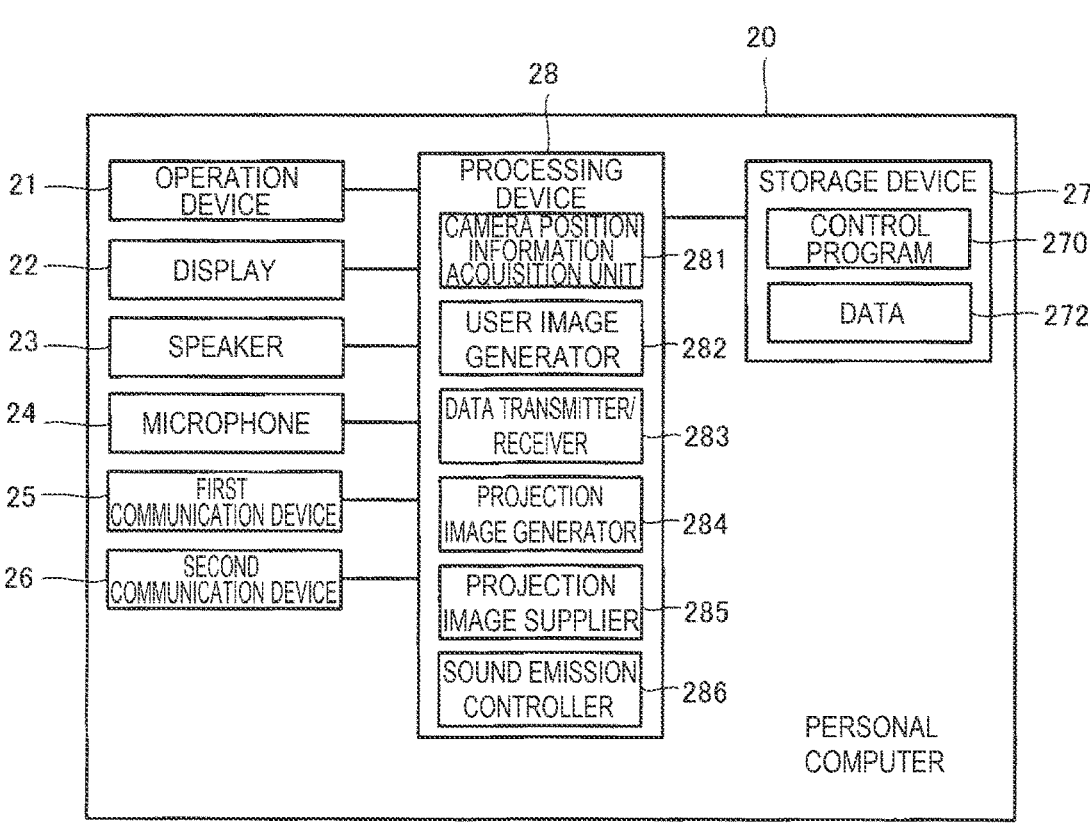
FIG. 3 is a block diagram showing a configuration of a personal computer 20.

FIG. 3 is a block diagram showing a configuration of the personal computer 20. It is possible to use other information processing devices such as a tablet terminal or a smartphone as the terminal device instead of the personal computer 20.

The personal computer 20 is provided with an operation device 21, a display 22, a speaker 23, a microphone 24, a first communication device 25, a second communication device 26, a storage device 27, and a processing device 28.

The operation device 21 is a device for receiving an operation from the users U3, U4. The operation device 21 is, for example, a keyboard or a mouse. Further, a touch panel having the display 22 and the operation device 21 integrated with each other can be used as the operation device 21.

The display 22 is a display device for displaying information to the outside, and is a variety of types of display panel such as a liquid crystal panel, or an organic EL (Electro-Luminescence) display panel.

The speaker 23 generates a sound based on the sound data. The speaker 23 is not limited to one incorporated in the personal computer 20, and it is possible to connect the speaker 23 separated from the personal computer 20 wirelessly or with wire.

The microphone 24 detects an ambient sound, and then outputs the ambient sound as the sound data. The microphone 24 is not limited to one incorporated in the personal computer 20, and it is possible to connect the microphone 24 separated from the personal computer 20 wirelessly or with wire.

The first communication device 25 is an interface for communicating with other terminal devices connected to the network N. The other terminal devices mean the conference server C in the present embodiment. The first communication device 25 communicates with a wireless LAN (Local Area Network) router with a communication method such as Wi-Fi. Wi-Fi is a registered trademark. The wireless LAN router is wireless LAN equipment provided with an intermediary function between a wireless LAN access point and the Internet. It should be noted that the first communication device 25 can be connected to the network N with a wired LAN. The first communication device 25 is an example of a communication interface for communicating with the terminal device T1 of the user U1.

The second communication device 26 is an interface for communicating with equipment located near the personal computer 20 such as the projector 30 or the conference camera 40. The second communication device 26 is an interface of, for example, wireless or wired LAN, Bluetooth, USB (Universal Serial Bus), or HDMI (High Definition Multimedia Interface). Bluetooth, USB, and HDMI are each a registered trademark. The second communication device 26 is provided with an interface such as an antenna in the case of a wireless system or a connector in the case of a wired system, and an interface circuit for electrically processing a signal received via the interface. The second communication device 26 is an example of a communication interface for communicating with the conference camera 40.

The storage device 27 is a recording medium which can be read by the processing device 28. The storage device 27 includes, for example, a nonvolatile memory and a volatile memory. As the nonvolatile memory, there can be cited, for example, a ROM (Read Only Memory), an EPROM (Erasable Programmable Read Only Memory), and an EEPROM (Electrically Erasable Programmable Read Only Memory). As the volatile memory, there can be cited, for example, a RAM.

The storage device 27 stores a control program 270 to be executed by the processing device 28, and a variety of types of data 272 to be used by the processing device 28. The control program 270 includes, for example, an operating system and a plurality of application programs. The application programs include a program of executing the online conference application.

The processing device 28 is formed of, for example, a single processor, or a plurality of processors. Citing an example, the processing device 28 is formed of a single CPU (Central Processing Unit) or a plurality of CPUs. Some or all of the functions of the processing device 28 can also be configured by a circuit such as a DSP (Digital Signal Processor), an ASIC (Application Specific Integrated Circuit), a PLD (Programmable Logic Device), or an FPGA (Field Programmable Gate Array). The processing device 28 executes a variety of types of processing in parallel or in sequence. The processing device 28 is an example of a processing device for controlling the first communication device 25 and the speaker 23.

The processing device 28 retrieves the control program 270 from the storage device 27 and then executes the control program 270 to thereby function as a camera position information acquisition unit 281, a user image generator 282, a data transmitter/receiver 283, a projection image generator 284, a projection image supplier 285, and a sound emission controller 286. The details of the functional units of the processing device 28 will be described later. The processing device 28 is an example of a control device.

B-2: Configuration of Projector 30

Figure 4:
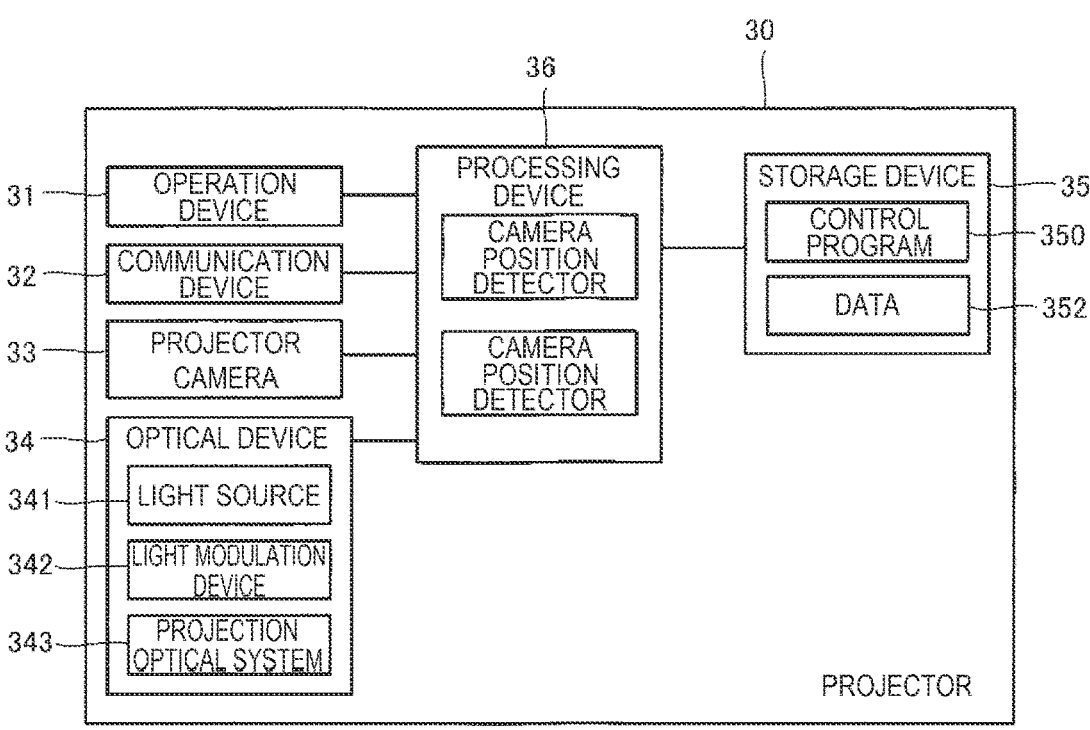
FIG. 4 is a block diagram showing a configuration of a projector 30.

FIG. 4 is a block diagram showing a configuration of the projector 30. The projector 30 includes an operation device 31, a communication device 32, a projector camera 33, an optical device 34, a storage device 35, and a processing device 36. The projector 30 is an example of a display device for displaying an image on a display surface P.

The operation device 31 is a device for receiving an operation from the users U3, U4. The operation device 31 is formed of, for example, a variety of operation buttons, operation keys, or a touch panel. The operation device 31 is provided to, for example, a chassis of the projector 30. Further, the operation device 31 can be a remote controller disposed separately from the chassis of the projector 30.

The communication device 32 is an interface for communicating with equipment located near the projector 30 such as the personal computer 20. The communication device 32 is the interface of, for example, wireless or wired LAN, Bluetooth, USB, or HDMI. Bluetooth, USB, and HDMI are each a registered trademark. The communication device 32 is provided with an interface such as an antenna in the case of a wireless system or a connector in the case of a wired system, and an interface circuit for electrically processing a signal received via the interface.

The projector camera 33 includes a light receiving optical system such as a lens, an imaging element for converting the light collected by the light receiving optical system into an electric signal, and so on, and generates image data corresponding to a taken image. The imaging element is a CCD (Charge Coupled Device) image sensor for receiving the light in, for example, a visible light region. The projector camera 33 includes a whole of the display surface P on which the image is displayed by the optical device 34 in an imaging range.

The projector camera 33 can be disposed as a separated body from other constituents of the projector 30. In this case, the projector camera 33 and the projector 30 can be connected to each other with a wired or wireless interface so as to be able to perform transmission/reception of data. Further, in this case, a positional relationship between the imaging range of the projector camera 33 and the display surface P of the optical device 34 has been calibrated.

The optical device 34 projects a projection image SG on the display surface P based on the image signal from the processing device 36. In the present embodiment, the display surface P is a maximum range in which the projection image SG can be projected using the optical device 34 out of a wall W. The display surface P is shown in, for example, FIG. 5. The optical device 34 has a light source 341, a light modulation device 342, and a projection optical system 343.

The light source 341 includes, for example, a halogen lamp, a xenon lamp, a super-high pressure mercury lamp, an LED (Light Emitting Diode), or a laser source. For example, the light source 341 emits red light, green light, and blue light separately from each other, or emits white light. When the light source 341 emits the white light, the light emitted from the light source 341 is reduced in unevenness of a luminance distribution by an integrator optical system not shown, and is then separated by a color separation optical system not shown into the red light, the green light, and the blue light, and then enters the light modulation device 342.

The light modulation device 342 includes three light modulation elements provided so as to correspond respectively to the red light, the green light, and the blue light. The light modulation elements are each includes, for example, a transmissive liquid crystal panel, a reflective liquid crystal panel, or a DMD (Digital Mirror Device). The light modulation elements respectively modulate the red light, the green light, and the blue light based on the image signal from the processing device 36 to generate image light beams of the respective colors. The image light beams of the respective colors generated in the light modulation device 342 are combined with each other by a color combining optical system not shown to thereby turn to full-color image light. It should be noted that the light modulation device 342 is not limited to the above, and can emit the image light beams of the respective colors in a time-sharing manner using a single-plate liquid crystal panel, a single-plate DMD, or the like to thereby make the full-color image light visually be recognized.

The projection optical system 343 images to project the full-color image light on a screen. The projection optical system 343 is an optical system including at least one projection lens, and can also include a zoom lens, a focus lens, or the like.

The storage device 35 is a recording medium which can be read by the processing device 36. The storage device 35 includes, for example, a nonvolatile memory and a volatile memory. As the nonvolatile memory, there can be cited, for example, a ROM, an EPROM, and an EEPROM. As the volatile memory, there can be cited, for example, a RAM.

The storage device 35 stores a control program 350 to be executed by the processing device 36, and a variety of types of data 352 to be used by the processing device 36. The control program 350 is executed by the processing device 36. The control program 350 includes, for example, an operating system and a plurality of application programs.

Further, in the present embodiment, a part of a storage area of the storage device 35 functions as a frame memory. The frame memory stores the projection image SG to be projected by the optical device 34 as the image data for one screen. It should be noted that the frame memory can be disposed separately from the storage device 35 for storing the control program 350 and so on.

In the present embodiment, it is possible to project an image with 1920 pixels in a horizontal direction and 1080 pixels in a vertical direction as the projection image SG. Therefore, it is possible to identify each of the pixels using an x-y coordinate system taking an upper left point of the projection image SG as a reference point, an x axis in the horizontal direction, and a y axis in the vertical direction. For example, assuming the upper left pixel as a coordinate (1, 1), the lower right pixel becomes a coordinate (1920, 1080). A coordinate of the frame memory can also be represented by the x-y coordinate system (x,y).

The processing device 36 is formed of, for example, a single processor, or a plurality of processors. Citing an example, the processing device 36 is constituted by a single CPU or a plurality of CPUs. Some or all of the functions of the processing device 36 can be configured by a circuit such as a DSP, an ASIC, a PLD, or an FPGA. The processing device 36 executes a variety of types of processing in parallel or in sequence. The processing device 36 is an example of a processing device for controlling the projector 30.

The processing device 36 retrieves the control program 350 from the storage device 35 and then executes the control program 350 to thereby function as a calibration processor 361 and a camera position detector 362. The details of the functional units of the processing device 36 will be described later.

B-3: Configuration of Conference Camera 40

The conference camera 40 includes a light receiving optical system such as a lens, an imaging element for converting the light collected by the light receiving optical system into an electric signal, a communication device for communicating with the second communication device 26 of the personal computer 20, a storage device, a processing device, and so on. The conference camera 40 is an example of a camera which is arranged on the display surface P, and which takes an image of the user U3. The imaging element is, for example, a CCD image sensor for receiving light in a visible light region. The conference camera 40 is arranged to take an image of the users U3 and U4 as participants of the online conference at the site K3. The conference camera 40 transmits image data corresponding to a taken image SK to the personal computer 20.

B-4: Positional Relationship Between Conference Camera 40 and Display Surface P

Figure 5:
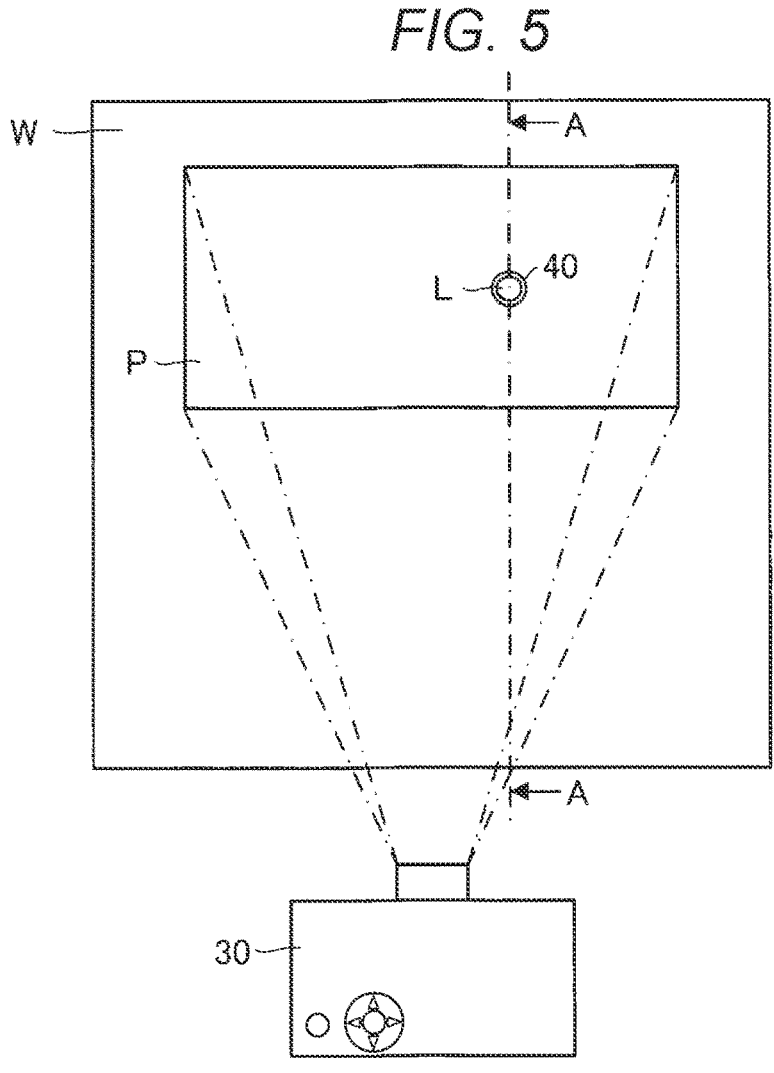
FIG. 5 is a diagram schematically showing a positional relationship between a conference camera 40 and a display surface P.
Figure 6:
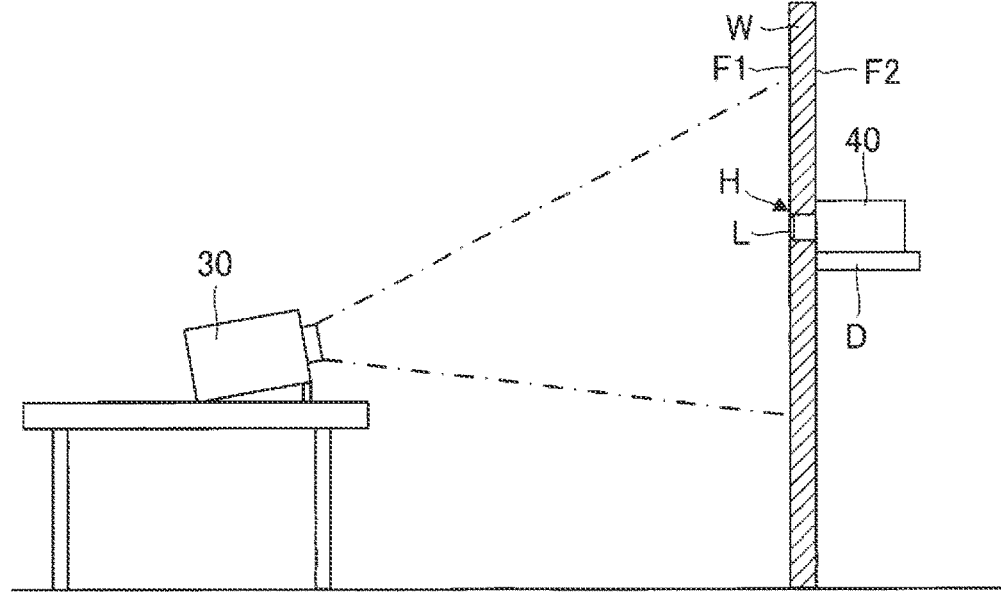
FIG. 6 is a cross-sectional view along the line A-A shown in FIG. 5.

FIG. 5 is a diagram schematically showing a positional relationship between the conference camera 40 and the display surface P. Further, FIG. 6 is a cross-sectional view along the line A-A shown in FIG. 5. In the present embodiment, the conference camera 40 is arranged on the wall W disposed at the site K3. More specifically, the conference camera 40 is disposed so as to expose a lens L from a cutout H provided to the wall W. The wall W has an obverse surface F1 exposed to a room, and a reverse surface F2 located at an opposite side to the obverse surface F1. At the reverse surface F2 side, there is disposed a pedestal D located in the vicinity of the cutout H, and the conference camera 40 is mounted on the pedestal D. It should be noted that the conference camera 40 is not limited to one arranged on the reverse surface F2 of the wall W, and can also be attached to, for example, the obverse surface F1 of the wall W.

In the present embodiment, the projector 30 projects the image using the wall W as the screen. The projector 30 is arranged so that a range in which the lens L is exposed in the wall W such as a range of the cutout H is included in the display surface P. In other words, the conference camera 40 is arranged on the display surface P. The example shown in FIG. 5 is an arrangement example at the site K1, and the lens L is arranged so as to be shifted slightly rightward in the front view of the display surface P.

C: Details of Processing Device 36 of Projector 30

Then, the details of the functional units realized by the processing device 36 of the projector 30 will be described. As described above, the processing device 36 of the projector 30 functions as the calibration processor 361 and the camera position detector 362.

C-1: Calibration Processor 361

The calibration processor 361 generates calibration data which associates the coordinate on the frame memory and the coordinate on the taken image of the projector camera 33 with each other. By a position on the frame memory and a position on the taken image of the projector camera 33 being associated with each other, it is possible to identify, for example, what area of the projection image SG projected on the display surface P an object showing in the taken image of the projector camera 33 overlaps.

The calibration processor 361 retrieves calibration image data from the storage device 35. The calibration processor 361 develops the calibration image data on the frame memory, and then generates the image signal corresponding to the calibration image data. By the optical device 34 being driven in accordance with the image signal, the calibration image is projected on the display surface P. The calibration image is an image in which, for example, marks having shapes set in advance are arranged at intervals.

Subsequently, the calibration processor 361 takes, with the projector camera 33, a taken image including the display surface P on which the calibration image is projected. The calibration processor 361 detects the marks showing in the taken image, and then identifies barycentric positions of the respective marks as coordinates of the respective marks in the taken image. The calibration processor 361 performs the association between the coordinates of the marks detected from the taken image and the coordinates of the marks on the frame memory. Due to this association, the calibration data for associating the coordinates on the taken image and the coordinates on the frame memory with each other is generated. The calibration data thus generated is stored in the storage device 35.

C-2: Camera Position Detector 362

The camera position detector 362 detects information represents a position of the conference camera 40 on the display surface P. The information representing the position of the conference camera 40 on the display surface P is hereinafter referred to as "camera position information." As the camera position information, it is possible to use a coordinate value in an X-Y coordinate system taking, for example, an upper left point of the display surface P as a reference point, an X axis in the horizontal direction, and a Y axis in the vertical direction. As described above, the projection image SG can be represented by the coordinate (1,1) through the coordinate (1920,1080) using the x-y coordinate system. In the display surface P, for example, an area where a pixel at the coordinate (1,1) in the projection image SG is defined as a coordinate (1,1). Thus, it is possible to identify an arbitrary position on the display surface P by a coordinate in a range from (1,1) to (1920, 1080)

The camera position detector 362 detects, for example, a coordinate of an outer edge of a portion of the conference camera 40 exposed on the display surface P as the camera position information. Further, when the portion of the conference camera 40 exposed on the display surface P has, for example, a circular shape, it is possible to use the coordinate of a central position of that portion, and a distance to the outer edge of that portion as the camera position information.

The camera position detector 362 detects the camera position information using, for example, any of Detection Method 1 through Detection Method 4 described below.
Detection Method 1

Detection Method 1 is a method of using a pattern detection. The camera position detector 362 uses the optical device 34 to project a grid-like pattern on the display surface P. Further, the camera position detector 362 uses the projector camera 33 to obtain the taken image of the display surface P. Since the light reflectance of the conference camera 40 and the light reflectance of the wall W are different from each other, a distortion or a lack of the pattern occurs in a boundary between the wall W and the conference camera 40. The camera position detector 362 detects the position of the display surface P where the distortion or the lack of the pattern occurs as the position of the conference camera 40.
Detection Method 2

Detection Method 2 is a method of providing the conference camera 40 with a beacon for the position detection. As the beacon, it is possible to use, for example, an infrared light emitting element. In this case, it is assumed that in the projector 30, for example, the projector camera 33 is provided with an infrared light receiving function, or there is disposed a camera provided with the infrared light receiving function separately from the projector camera 33. In the taken image of the camera provided with the infrared light receiving function, there shows the infrared light emitted from the beacon. The camera position detector 362 detects the position of the infrared light as the position of the conference camera 40.
Detection Method 3

Detection Method 3 is a method of detecting the conference camera 40 using image recognition. For example, the camera position detector 362 obtains shape data representing a shape of a portion to be exposed on the display surface P in advance out of the conference camera 40. For example, it is possible to arrange that the conference camera 40 having the shape set in advance is used in common in the display system 10. The camera position detector 362 obtains the taken image of the projector camera 33 to determine whether or not an object having a shape corresponding to the shape data shows in the taken image. When the object having the shape corresponding to the shape data shows therein, the camera position detector 362 detects the position of that object as the position of the conference camera 40.
Detection Method 4

Detection Method 4 is a method of detecting projection light from the projector 30 with the projector camera 33. The camera position detector 362 irradiates the display surface P in sequence with such light high in directionality as a laser beam. It is assumed that the irradiation position of the laser beam can be identified using, for example, the X-Y coordinate system set in the display surface P. During this process, the projector camera 33 continues the imaging. When the laser beam enters a lens of the projector camera 33, the taken image becomes in a state in which a highlight detail loss occurs. The camera position detector 362 detects the irradiation position of the laser beam when the taken image having the highlight detail loss is obtained as the position of the conference camera 40.

D: Details of Processing Device 28 of Personal Computer 20

Then, the details of the functional units realized by the processing device 28 of the personal computer 20 will be described. As described above, the processing device 28 of the personal computer 20 functions as the camera position information acquisition unit 281, the user image generator 282, the data transmitter/receiver 283, the projection image generator 284, the projection image supplier 285, and the sound emission controller 286.
D-1: Camera Position Information Acquisition Unit 281

The camera position information acquisition unit 281 acquires the camera position information representing the position of the conference camera 40 on the display surface P. In the present embodiment, the camera position information acquisition unit 281 obtains the camera position information detected by the camera position detector 362 via the second communication device 26.
D-2: User Image Generator 282

Figure 7:
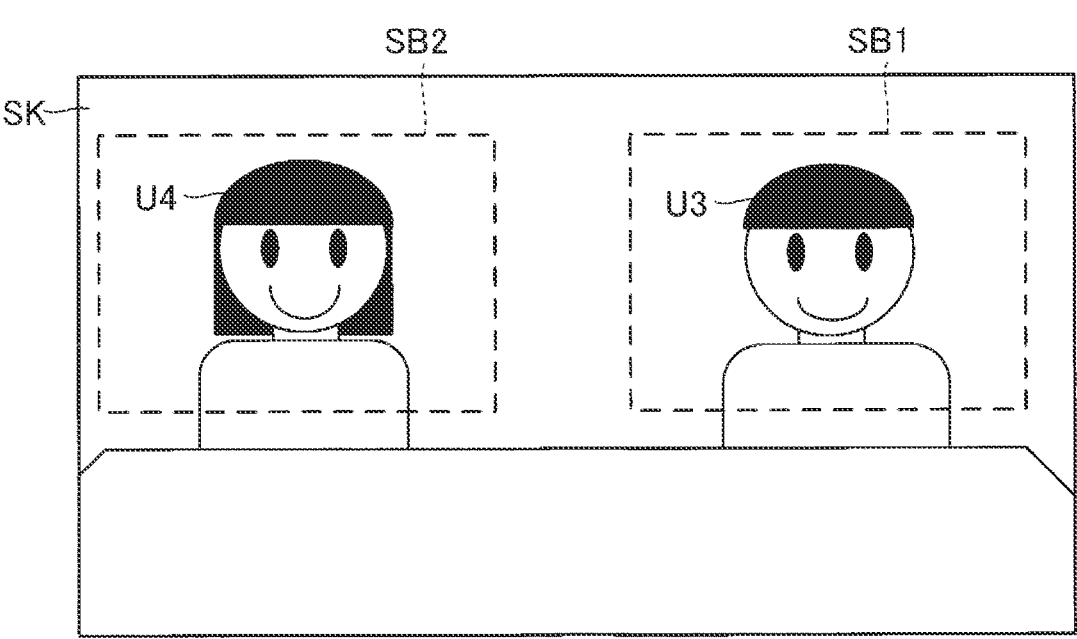
FIG. 7 is a diagram schematically showing a relationship between a taken image SK and partial images SB1, SB2.

The user image generator 282 generates a partial image SB1 in which the user U3 shows and a partial image SB2 in which the user U4 shows from the taken image SK taken by the conference camera 40. FIG. 7 is a diagram schematically showing a relationship between the taken image SK and the partial images SB1, SB2. In the taken image SK of the conference camera 40, there show the two users U3, U4 located at the site K3. The user image generator 282 detects faces of the users U3, U4 from the taken image SK using an image-recognition technique to generate the partial image SB1 including the face of the user U3 and the partial image SB2 including the face of the user U4. The reason that such partial images SB1, SB2 are generated is for reducing an uncomfortable feeling when arranging the taken image with images of other users U1, U2 side by side. Further, compared to the taken image SK, expressions of the respective faces of the users U3, U4 are easier to figure out in the partial images SB1, SB2.

It should be noted that when a user other than the users U3, U4 joins the site K3, the user image generator 282 further generates a partial image in which the user having joined shows. Further, when one of the user U3 and the user U4 is located alone at the site K3, the partial image in which one of the user U3 and the user U4 shows is generated from the taken image SK.

Further, for example, when at least one of the users U3, U4 hesitates to display the partial images SB1, SB2 in which own faces show during the online conference, or when the online conference is a private exchange field, it is possible to arrange that it is possible to designate to use, for example, an avatar image copying themselves, or a character image representing own names or initials instead of the partial images SB1, SB2. Alternatively, it is possible to arrange that it is possible to designate to use images obtained by performing an image processing treatment on the partial images SB1, SB2. The image processing treatment is, for example, a treatment of converting the faces of the users U3, U4 into animal-like images or illustrative images, a treatment of replacing some of components of the faces of the users U3, U4, or a gradation treatment. An image to be displayed in accordance with the user U3 in the online conference such as the partial image SB1, the avatar image, or the image obtained by performing the image processing treatment on the partial image SB1 is hereinafter referred to as an "image S3 representing the user U3." The same applies to the other users U1, U2, and U4.

D-3: Data Transmitter/Receiver 283

The data transmitter/receiver 283 transmits image data corresponding to the image S3 representing the user U3 and the image data corresponding to the image S4 representing the user U4 both generated by the user image generator 282 to the conference server C.

Further, when sharing the data from the site K3, the data transmitter/receiver 283 transmits the shared data to the conference server C. In the present embodiment, it is assumed that a presentation material from the site K3 is shared in the online conference, and the user U3 performs a presentation related to the presentation material. An image showing the presentation material is referred to as a presentation image SP. The presentation image SP is an example of an image related to an utterance by the user U3. The presentation image SP can be reworded as an image related to a content of the utterance by the user U3, an image different from an image obtained by imaging one of the users U1 through U4, an image shared by the user U3, an image showing a data file, or the like.

Further, the data transmitter/receiver 283 transmits the sound data generated by the microphone 24 to the conference server C. The image data corresponding to the image S3, the image data corresponding to the image S4, and the sound data generated by the microphone 24 are associated as the data generated in the site K3.

Further, the data transmitter/receiver 283 receives the image data taken in the other sites K1, K2 and the sound data collected in the other sites K1, K2 from the conference server C. The image data taken in the site K1 is the image data corresponding to the image S1 representing the user U1. The image data taken in the site K2 is the image data corresponding to the image S2 representing the user U2. The sound data collected in the site K1 is sound data including an utterance of the user U1. The sound data collected in the site K2 is sound data including an utterance of the user U2. The image data taken in the site K1 and the sound data collected in the site K1 are associated with each other. Further, the image data taken in the site K2 and the sound data collected in the site K2 are associated with each other.

Further, when the data from the other sites K1, K2 are shared, the data transmitter/receiver 283 receives the shared data from the conference server C. As described above, although it is assumed that the user U3 performs the presentation related to the presentation material while sharing the presentation material from the site K3 in the present embodiment, it is possible for the user U3 to perform the presentation regarding the presentation material shared from the other sites K1, K2.

D-4: Projection Image Generator 284

The projection image generator 284 generates the projection image SG to be projected by the projector 30. The projection image generator 284 generates the projection image SG using the image data taken in the other sites K1, K2 and received by the data transmitter/receiver 283, the image data corresponding to the partial image SB1 and the image data corresponding to the partial image SB2 generated by the user image generator 282, and the shared data. On this occasion, the projection image generator 284 determines the layout of the projection image SG based on the camera position information obtained by the camera position information acquisition unit 281, which one of the users U1 through U4 is the speaker in the conference, and a type of the image constituting the projection image SG.

Figure 8:
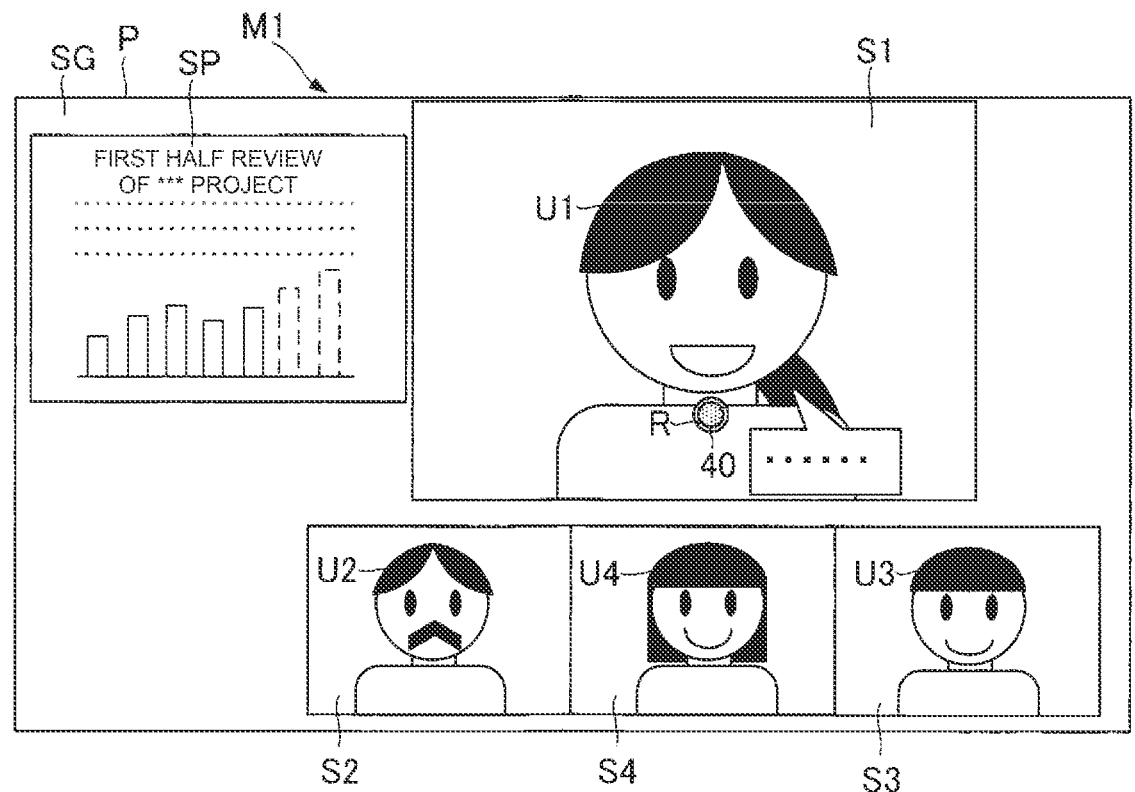
FIG. 8 is a diagram showing a layout of a projection image SG during an utterance M1 by a user U1.

FIG. 8 shows the layout of the projection image SG during an utterance M1 by the user U1. During the utterance M1 by the user U1, due to the sound emission controller 286 described later, a sound from the terminal device T1 obtained via the first communication device 25 is output from the speaker 23. Whether or not the user U1 is making an utterance is determined based on whether or not a level of the sound data collected in, for example, the site K1 is no lower than a predetermined value. When the level of the sound data collected in the site K1 is no lower than the predetermined value, the projection image generator 284 determines that the user U1 showing in the image S1 taken in the site K1 is making the utterance. During the utterance M1 by the user U1, it is supposed that, for example, a question or a statement on the presentation by the user U3 is spoken.

In the projection image SG, there are included the image S1 representing the user U1, the image S2 representing the user U2, the image S3 representing the user U3, the image S4 representing the user U4, and the presentation image SP. The presentation image SP is an example of a first image, and the image S1 is an example of a second image. The image S1 is an image obtained by imaging a range including a face of the user U1. The images S1, S2 are images corresponding to the image data taken in the other sites K1, K2 and received by the data transmitter/receiver 283. Further, the images S3, S4 are partial images SB1, SB2 generated by the user image generator 282. The projection image SG can be said to be an image in which images different in type are arranged.

Regarding the projection image SG during the utterance M1 by the user U1, the projection image generator 284 displays the image S1 representing the user U1 at a position closer to a position of the conference camera 40 on the display surface P than a position of the presentation image SP. In other words, in the period in which the user U1 is making an utterance, there are displayed on the display surface P the presentation image SP and the image S1 arranged at the position closer to the position of the conference camera 40 on the display surface P than the position of the presentation image SP. During the utterance M1 by the user U1, the gazes of the users U3, U4 are directed to the image S1 representing the user U1. The image S1 is located at a position closer to the conference camera 40 than the presentation image SP. Therefore, the gazes of the users U3, U4 are directed to the position near the conference camera 40, as a result.

The taken image SK taken by the conference camera 40 is transmitted to the users U1, U2. In other words, the data transmitter/receiver 283 transmits the taken image SK taken by the conference camera 40 during the period in which the user U1 is making an utterance, to the conference server C. Further, the conference server C transmits the taken image SK to the terminal device T1 used by the user U1. In the taken image SK taken by the conference camera 40, the gazes of the users U3, U4 are directed to a position near the conference camera 40. The users U1, U2 who saw this feel like having the conference while making eye contact with the users U3, U4, and thus, it is possible to help smooth communication in the online conference.

In the present embodiment, the projection image generator 284 arranges the image S1 at a position overlapping the conference camera 40 during the utterance M1 by the user U1. In other words, displaying the image S1 during the period in which the user U1 is making an utterance corresponds to displaying the image S1 at the position overlapping the conference camera 40 on the display surface P. Thus, it is possible to direct the gazes of the users U3, U4 to a position closer to the conference camera 40 compared to when the image S1 is displayed at a position failing to overlap the conference camera 40.

On the other hand, when a portion in which the face of the user U1 shows out of the image S1 and the conference camera 40 overlap each other, the visibility of the face of the user U1 deteriorates, and at the same time, there is a possibility that the users U3, U4 viewing the image S1 have an uncomfortable feeling. Therefore, when making the image S1 and the conference camera 40 overlap each other, the projection image generator 284 arranges the image S1 so that a portion in which the user U1 shows and the conference camera 40 do not overlap each other. In other words, the portion overlapping the conference camera 40 out of the image S1 is a portion other than the face of the user U1. A range of the face of the user U1 in the image S1 can be identified by, for example, a facial recognition technology. In the present embodiment, the projection image generator 284 arranges the image S1 so that the conference camera 40 overlaps a portion in which a part below the chin of the user U1, namely the neck of the user U1 shows. Thus, it is possible to make the users U3, U4 turn the gazes on a position closer to the conference camera 40 without deteriorating the visibility of the face of the user U1.

Figure 9:
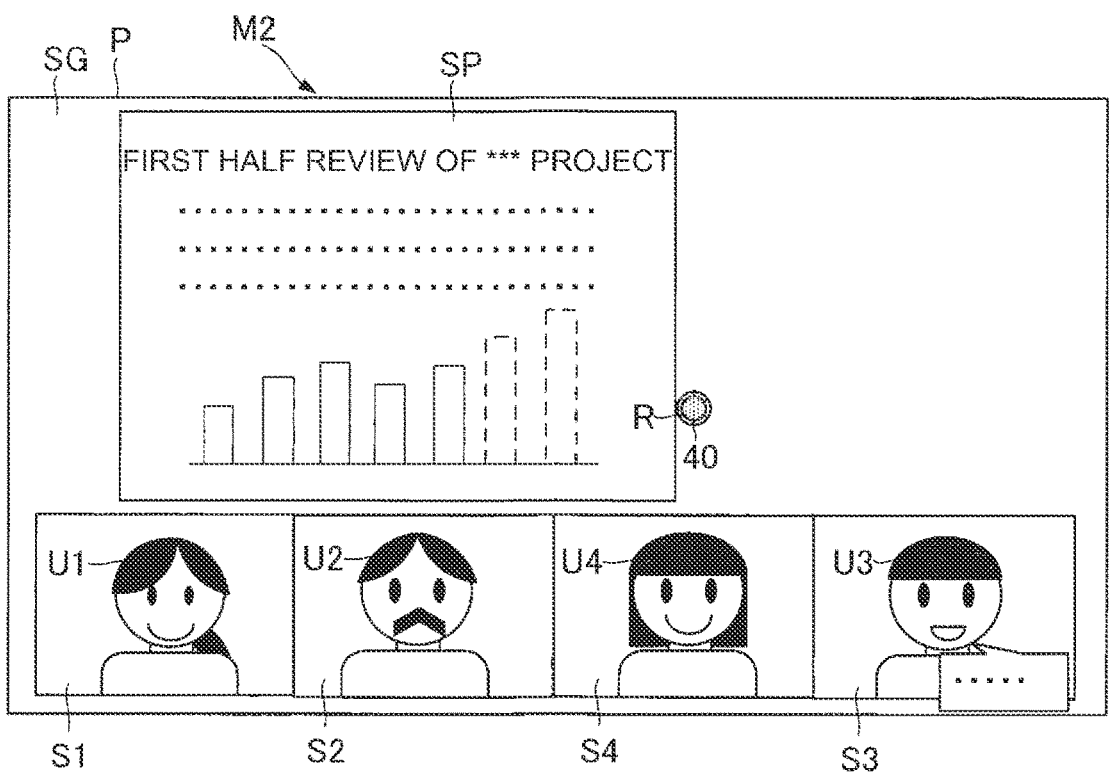
FIG. 9 is a diagram showing the layout of the projection image SG during an utterance M2 by a user U3.

Further, in FIG. 8, during the utterance M1 by the user U1, the image S1 representing the user U1 is displayed at a larger size than sizes of the images S2 through S4 representing the other users U2 through U4. In other words, during the utterance M1 by the user U1, the projection image generator 284 displays the image S1 representing the user U1 at a larger size than during a period in which the user U1 does not make an utterance. The projection image SG during the period in which the user U1 does not make an utterance is shown in FIG. 9. Thus, it becomes easier for the other users U2 through U4 to figure out the expression on the face of the user U1 as a speaker. Further, it becomes easy to identify which one of the plurality of users U1 through U4 is the speaker. Besides the above, it is possible for the projection image generator 284 to make the size of the image S1 the same as the sizes of the other images S2 through S4 but change only the position of the image S1 during the utterance M1 by the user U1.

Further, the projection image generator 284 performs a mask treatment on a portion overlapping the conference camera 40 out of the projection image SG. In other words, displaying the image S1 during the period in which the user U1 makes an utterance includes displaying a portion of the image S1 overlapping the range in which the conference camera 40 is arranged with a luminance lower than the luminance of other portions of the image S1. More particularly, the portion overlapping the conference camera 40 means a portion overlapping a portion of the conference camera 40 exposed at the surface F1 side of the wall W. The portion overlapping the conference camera 40 out of the projection image SG is hereinafter referred to as a "camera overlapping portion R." In the present embodiment, the mask treatment is a treatment of decreasing the luminance of the camera overlapping portion R to a lower level than those of other portions, and means, for example, a treatment of changing the camera overlapping portion R to a black image. It should be noted that in the present embodiment, it is assumed that the mask treatment is always performed on the camera overlapping portion R in the projection image SG besides the period in which the user U1 makes an utterance.

The projection image generator 284 generates, for example, a mask image obtained by changing the portion corresponding to the camera overlapping portion R to the black image, and making other portions transparent, and superimposes the mask image on the image in which the images S1 through S4 and the presentation image SP are arranged to thereby decrease the luminance of the camera overlapping portion R to a lower level than those of other portions. Alternatively, it is possible to arrange that the projection image generator 284 performs the image treatment so as to decrease the luminance of the portion corresponding to the camera overlapping portion R on the image in which the images S1 through S4 and the presentation image SP are arranged to thereby decrease the luminance of the camera overlapping portion R to a lower level than those of other portions. It is assumed that former one of the methods, namely superimposing the mask image, is adopted in the present embodiment.

By performing the mask treatment, it is possible to prevent the projection light from the projector 30 from entering the lens L of the conference camera 40, and thus, it is possible to prevent an imaging failure such as a highlight detail loss from occurring. More particularly, by performing the mask treatment on the camera overlapping portion R, the intensity of the light projected on the camera overlapping portion R decreases, and thus, it is possible to prevent the imaging failure. It should be noted that the range in which the mask treatment is performed in the projection image SG can be a range which includes the camera overlapping portion R and which is larger than the camera overlapping portion R.

FIG. 9 shows the layout of the projection image SG during an utterance M2 by the user U3. The "during an utterance M2 by the user U3" means when, for example, the user U3 performs a presentation to the other users U1, U2, and U4 while referring to the presentation image SP. During the presentation by the user U3, the projection image generator 284 makes the display size of the presentation image SP on the display surface P larger than during the utterance M1 by the user U1. In other words, in the period in which the user U3 makes an utterance, there are displayed the image S1 and the presentation image SP larger in size than the presentation image SP in the period in which the user U1 makes the utterance on the display surface P.

Whether or not the user U3 is making an utterance is determined based on whether or not a level of the sound data collected by, for example, the microphone 24 is no lower than a predetermined value. When the level of the sound data collected by the microphone 24 is no lower than the predetermined value, the projection image generator 284 determines that the user U3 showing in the taken image SK taken by the conference camera 40 is making the utterance.

It is conceivable that the user U3 performing the presentation makes an utterance while looking at the presentation image SP displayed on the display surface P, and therefore, by increasing the display size of the presentation image SP during the utterance M2 by the user U3, the visibility of the presentation image SP is improved, and it is possible to help the presentation by the user U3.

Further, when the size of the presentation image SP on the display surface P becomes larger compared to during the utterance M1 by the user U1, the distance between the conference camera 40 and the presentation image SP inevitably shortens. In other words, displaying the presentation image SP during the period in which the user U3 is making an utterance corresponds to displaying the presentation image SP at a position closer to the position of the conference camera 40 than the position of the presentation image SP during the period in which the user U1 is making an utterance. The gaze of the user U3 during the presentation is directed to the presentation image SP. The presentation image SP is located at a position closer to the conference camera 40 than the position during the utterance M1 by the user U1. Therefore, the gaze of the user U3 is directed to the position near the conference camera 40, as a result.

The taken image SK taken by the conference camera 40 is transmitted to the users U1, U2. In other words, the data transmitter/receiver 283 transmits the taken image SK taken by the conference camera 40 during the period in which the user U3 is making an utterance, to the conference server C. Further, the conference server C transmits the taken image SK to the terminal devices T1, T2 used by the users U1, U2. In the taken image SK taken by the conference camera 40, the gaze of the user is directed to a position near the conference camera 40. The users U1, U2 who saw this feel like receiving the presentation while making eye contact with the user U3, and thus, it is possible to help smooth communication in the online conference.

Further, during the utterance M2 by the user U3, the projection image generator 284 generates the projection image SG so that none of the images S1 through S4 and the presentation image SP overlaps the camera overlapping portion R. In other words, displaying the image S1 and the presentation image SP during the period in which the user U3 is making an utterance includes displaying the image S1 and the presentation image SP at the position not overlapping the camera overlapping portion R. In this way, it is possible to prevent the visibility of the images S1 through S4 and the presentation image SP from deteriorating due to the camera overlapping portion R. It should be noted that it is arranged that the images S1 through S4 and the presentation image SP do not overlap the camera overlapping portion R in the present embodiment, but it is possible to arrange, for example, the camera overlapping portion R and an outer edge of at least one of the images S1 through S4 and the presentation image SP so as to overlap each other. This is because when the portion overlapping the camera overlapping portion R is the outer edge of the image, the possibility that the visibility of the image extremely deteriorates is low.

Figure 10:
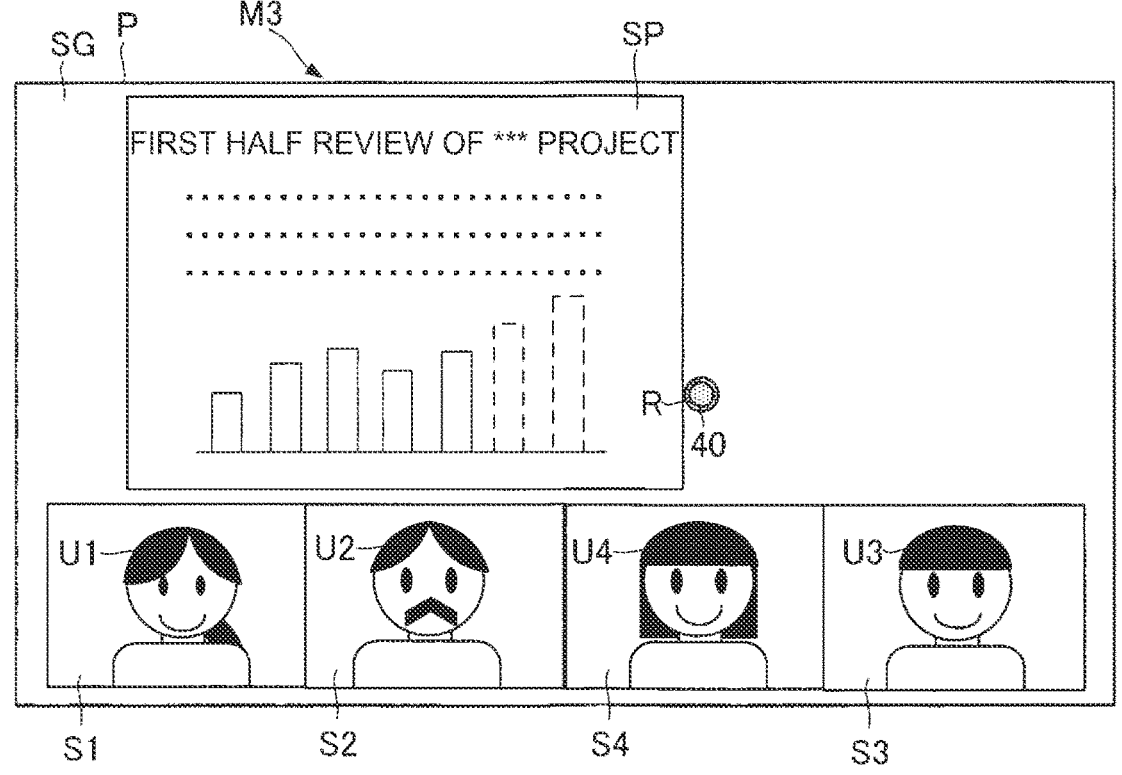
FIG. 10 is a diagram showing the layout of the projection image SG in a state M3 in which no utterer exists.

FIG. 10 shows the layout of the projection image SG in a state M3 in which no speaker exists. The layout of the projection image SG in the state M3 in which no speaker exists is substantially the same as the layout of the projection image SG during the utterance M2 by the user U3 shown in, for example, FIG. 9. By displaying the images S1 through S4 and the presentation image SP at positions not overlapping the camera overlapping portion R as shown in FIG. 10, it is possible to prevent the visibility of the images S1 through S4 and the presentation image SP from deteriorating due to the camera overlapping portion R. Further, since the presentation image SP is displayed at a larger size than during the utterance M1 by the user U1, the visibility of the presentation image SP is improved, and it is possible to make it easy to conduct a study on the presentation image SP. The layout of the projection image SG shown in FIG. 9 and FIG. 10 is hereinafter referred to as a "reference layout."

Figure 11:
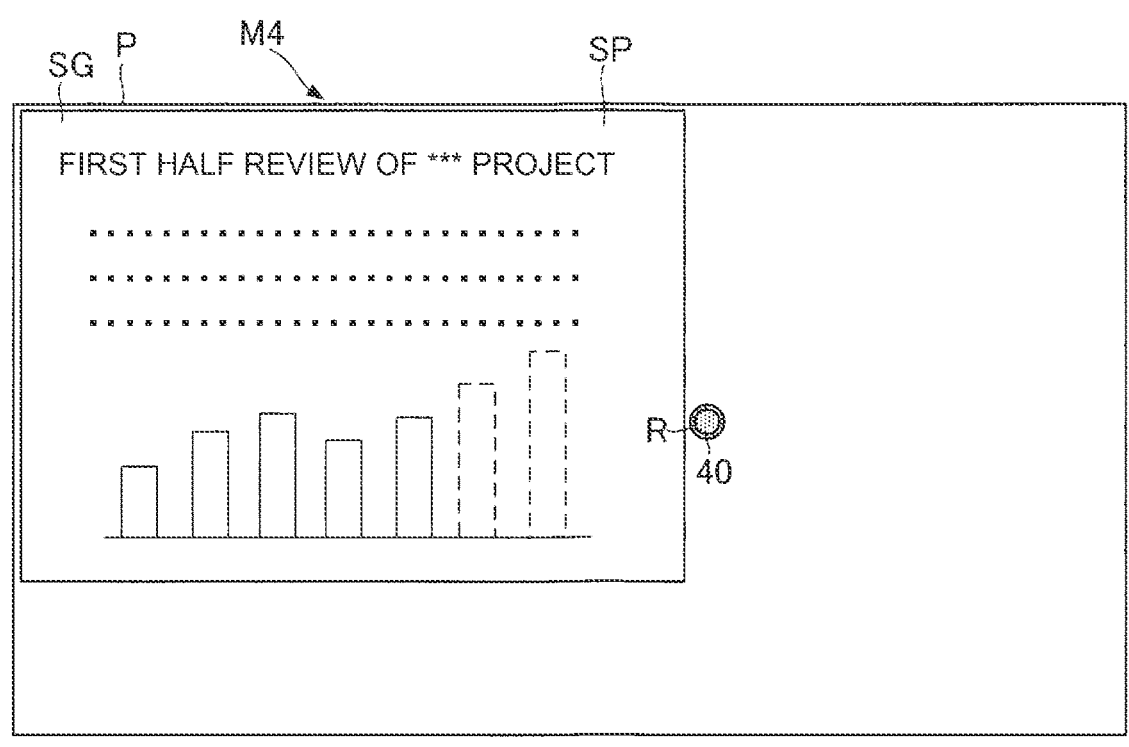
FIG. 11 is a diagram showing the layout of the projection image SG during an offline conference M4.

FIG. 11 shows the layout of the projection image SG during an offline conference M4. The display system 10 is used not only for the online conference, but also for a conference held offline only by, for example, the users U3, U4 located at the site K3. In such a case, there is no need to display the images S1, S2 representing the users U1, U2 who do not join the conference. Further, since the users U3, U4 located at the site K3 can visually observe each other's face, there is no need to display the images S3, S4. In other words, in the offline conference, it is sufficient to display only the presentation image SP on the display surface P.

In the case of the offline conference, the projection image generator 284 generates the projection image SG so that the presentation image SP is displayed at a maximum size keeping the aspect ratio at, for example, a position not overlapping the camera overlapping portion R. For example, in the present embodiment, the conference camera 40 is located at the slightly right side when viewing the display surface P from the front. Therefore, it is possible to provide a larger display area in the left part of the display surface P. The projection image generator 284 displays the presentation image SP at a maximum size within a range not overlapping the conference camera 40 with reference to an upper left point of the display surface P. In this way, it is possible to improve the visibility of the presentation image SP in the offline conference.

D-5: Projection Image Supplier 285

The projection image supplier 285 supplies the projector 30 with the image data of the projection image SG generated by the projection image generator 284. The projector 30 having received the supply of the image data drives the optical device 34 based on the image data to display the projection image SG on the display surface P.

D-6: Sound Emission Controller 286

The sound emission controller 286 controls sound output from the speaker 23. The sound emission controller 286 controls the speaker 23 so as to output the sound data collected in the other sites K1, K2 and received by the data transmitter/receiver 283.

E: Operation of Processing Device 28

Figure 12:
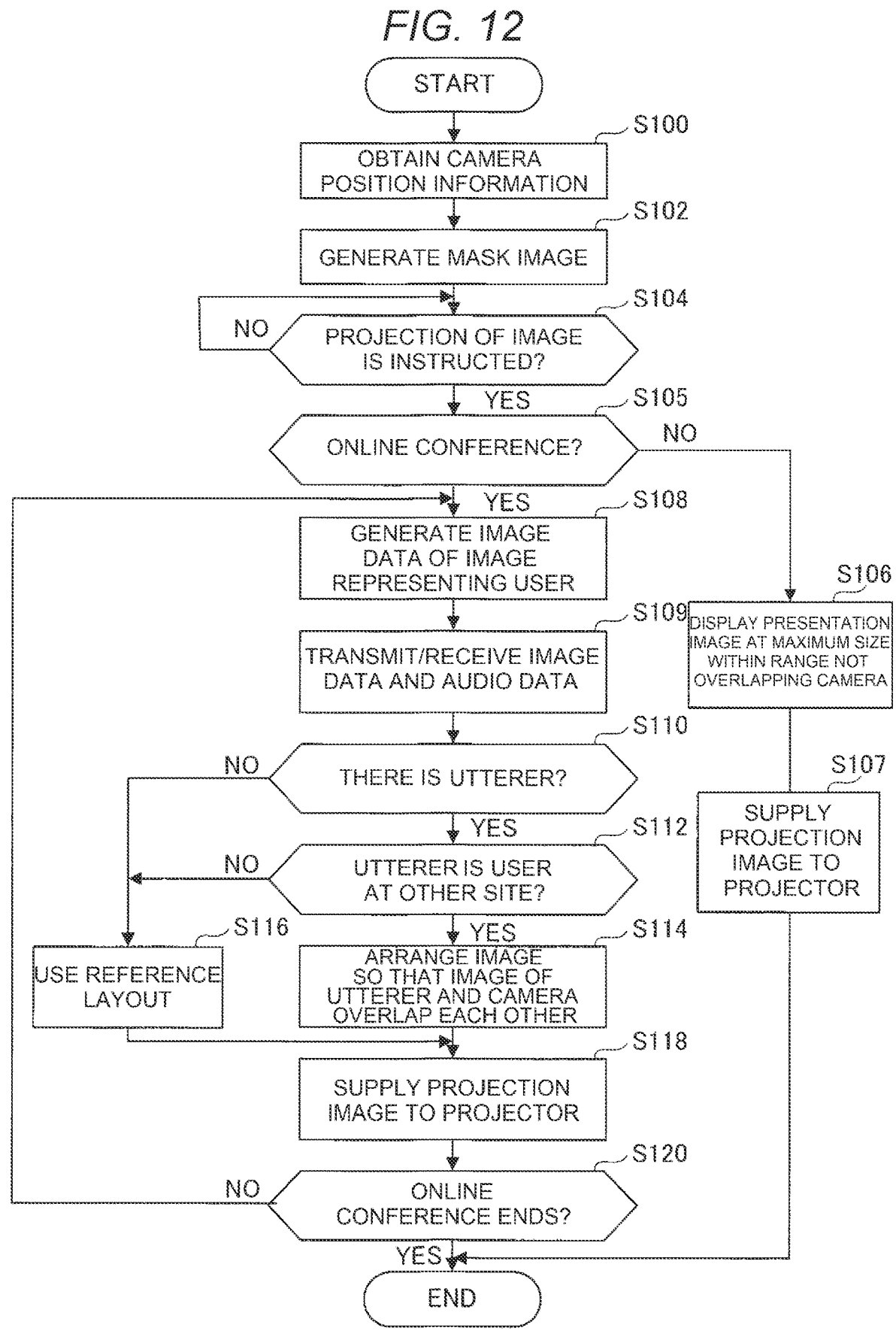
FIG. 12 is a flowchart showing a flow of a display method to be executed by a processing device 28 in accordance with a control program 270.

FIG. 12 is a flowchart showing a flow of a display method to be executed by the processing device 28 in accordance with the control program 270. When the display system 10 is started up, the processing device 28 functions as the camera position information acquisition unit 281 to thereby obtain (step S100) the camera position information representing the position of the conference camera 40 on the display surface P. The processing device 28 functions as the projection image generator 284 to thereby identify the camera overlapping portion R in the projection image SG based on the camera position information, and then generate (step S102) the mask image in which the camera overlapping portion R is changed to the black image. The mask image thus generated is supplied to the projector 30 by the processing device 28 functioning as the projection image supplier 285. The projector 30 displays the mask image on the display surface P.

The processing device 28 waits (NO in the step S104) until the projection of the image is instructed. When the projection of the image is instructed (YES in the step S104), the processing device 28 determines (step S105) whether or not the image projection is for the online conference. Whether or not the image projection is for the online conference can be determined based on, for example, whether or not the application of performing the image projection is the online conference application.

When the projection image SG is not the image for the online conference (NO in the step S105), namely in the case of the offline image projection, the projection image generator 284 generates (step S106) the projection image SG so that the presentation image SP is displayed at the maximum size at a position not overlapping the camera overlapping portion R as shown in, for example, FIG. 11. The processing device 28 functions as the projection image supplier 285 to thereby supply (step S107) the projection image SG to the projector 30 to terminate the processing of the present flowchart. The projector 30 displays the projection image SG on the display surface P.

In contrast, when the projection image SG is the image for the online conference (YES in the step S105), the processing device 28 functions as the user image generator 282 to thereby generate (step S108) the image data corresponding to the image S3 representing the user U3 and the image data corresponding to the image S4 representing the user U4 from the taken image SK of the conference camera 40. The processing device 28 functions as the data transmitter/receiver 283 to thereby be connected to the conference server C to transmit and receive (step S109) the image data and sound data. More particularly, the processing device 28 receives the image data taken in the other sites K1, K2 and the sound data collected in the other sites K1, K2, and at the same time, transmits the image data taken in the site K3 and the sound data collected in the site K3. The sound data collected in the other sites K1, K2 is output from the speaker 23 due to the processing device 28 functioning as the sound emission controller 286.

The processing device 28 determines (step S110) whether or not there is a speaker in the online conference based on the sound data collected in the sites K1 through K3. When there is no speaker (NO in the step S110), the processing device 28 functions as the projection image generator 284 to thereby arrange the images S1 through S4 and the presentation image SP in the reference layout shown in FIG. 9 and FIG. 10, and then superimpose the images S1 through S4 and the presentation image SP on the mask image to generate (step S116) the projection image SG. The processing device 28 functions as the projection image supplier 285 to thereby supply (step S118) the projection image SG to the projector 30. The projector 30 displays the projection image SG on the display surface P.

On the other hand, when there is a speaker in the step S110 (YES in the step S110), the processing device 28 determines (step S112) whether or not the speaker is one of the users U1, U2 at the other sites K1, K2. When the speaker is one of the users U1, U2 at the other sites K1, K2 (YES in the step S112), the processing device 28 functions as the projection image generator 284 to thereby arrange the images S1 through S4 so that the image of the speaker and the conference camera 40 overlap each other, and then superimpose the result on the mask image to generate (step S114) the projection image SG. The processing device 28 functions as the projection image supplier 285 to thereby supply (step S118) the projection image SG to the projector 30. The projector 30 displays the projection image SG on the display surface P.

Further, when the speaker is not one of the users U1, U2 at the other sites K1, K2 (NO in the step S112), namely the speaker is one of the users U3, U4 at the site K3, the processing device 28 functions as the projection image generator 284 to thereby arrange the images S1 through S4 in the reference layout, and then superimpose the result on the mask image to generate (step S116) the projection image SG. The processing device 28 functions as the projection image supplier 285 to thereby supply (step S118) the projection image SG to the projector 30. The projector 30 displays the projection image SG on the display surface P.

The processing device 28 returns to the step S106 to repeat the subsequent processing until the online conference ends (NO in the step S120). When the online conference ends (YES in the step S120), the processing device 28 terminates the processing represented by the present flowchart.

F: Conclusion of Embodiment

As described hereinabove, in the display method according to the embodiment, when displaying the projection image SG in which the images different in type are mixed, on the display surface P on which the conference camera 40 is arranged, the layout is changed in accordance with the type of the image and the speaker. Thus, it is possible to improve the visibility of the projection image SG, and at the same time, it is possible to help understanding of the content of the projection image SG. Therefore, it is possible to display the projection image SG with an improved layout compared to, for example, the layout in which a single image is displayed at the center at a large size irrespective of the type of the image.

In the display method according to the embodiment, the size of the presentation image SP during the utterance M2 by the user U3 is made larger than the size of the presentation image SP during the utterance M1 by the user U1. Thus, it is possible to improve the visibility of the presentation image SP displayed on the display surface P, and thus, it is possible to help the utterance, namely the presentation, by the user U3.

Further, in the display method according to the embodiment, the image S1 representing the user U1 is displayed at a position closer to the position of the conference camera 40 than the position at which the presentation image SP is displayed during the period in which the sound by the user U1 is output. Further, in the display method according to the embodiment, the images S3, S4 obtained by the conference camera 40 during the period in which the sound by the user U1 is output are transmitted to the terminal device T1 used by the user U1. In general, since the users U3, U4 viewing the display surface P gaze on the image S1 representing the user U1 in the period in which the sound by the user U1 is output, by arranging the image S1 at such a position as described above, the gazes of the users U3, U4 are turned on the vicinity of the conference camera 40. Therefore, the user U1 having received the transmission of the taken image SK of the conference camera 40 recognizes that the gazes of the users U3, U4 are directed to a position close to him- or herself, and it is possible to reduce the uncomfortable feeling caused by the misalignment of the gazes.

Further, in the display method according to the embodiment, the presentation image SP is displayed at a position closer to the conference camera 40 during the period in which the sound by the user U3 is output than during the period in which the sound by the user U1 is output. Further, in the display method according to the embodiment, the images S3, S4 obtained by the conference camera 40 during the period in which the sound by the user U3 is output are transmitted to the terminal device T1 used by the user U1. Since it is conceivable that the user U3 looks at the presentation image SP during the presentation, the gaze of the user U3 is directed to a place near the conference camera 40. On this occasion, by transmitting the image S3 taken by the conference camera 40 to the terminal device T1 of the user U1, it is possible for the user U1 to obtain a feeling like the user U3 makes an utterance while facing to the user U1.

Therefore, it is possible to realize such communication as to actually meet and talk even in the online conference.

Further, in the display method according to the embodiment, the image S1 is displayed at the position overlapping the conference camera 40 on the display surface P during the period in which the sound by the user U1 is output. Thus, the gazes of the users U3, U4 are directed to a position closer to the conference camera 40. Therefore, the user U1 having received the transmission of the taken image SK of the conference camera 40 recognizes that the gazes of the users U3, U4 are directed to a position closer to him- or herself, and it is possible to further reduce the uncomfortable feeling caused by the misalignment of the gazes.

Further, in the display method according to the embodiment, the portion overlapping the conference camera 40 out of the image S1 is set to a portion other than the face of the user U1. The portion to which the users U3, U4 pay the closest attention out of the image S1 is the portion of the face of the user U1. By setting the portion overlapping the conference camera 40 to the portion other than the face of the user U1, it is possible to prevent the visibility of the face of the user U1 from deteriorating due to the conference camera 40.

Further, in the display method according to the embodiment, the portion of the image S1 overlapping the conference camera 40 is displayed with a luminance lower than the luminance of other portions of the image S1. Thus, it is possible to reduce the luminance of the projection light of the projector 30 entering the lens L of the conference camera 40, and thus, it is possible to prevent the imaging failure of the taken image SK of the conference camera 40.

Further, in the display method according to the embodiment, the images S1 through S4 and the presentation image SP are displayed at the positions not overlapping the conference camera 40 during the period in which the user U3 is making an utterance. Thus, it is possible to improve the visibility of the images S1 through S4 and the presentation image SP.

Further, the display system 10 according to the embodiment is provided with the first communication device 25 for communicating with the conference camera 40 which is arranged on the display surface P, and which images the user U3, and the terminal device T1 of the user U1, the projector 30 for displaying the image on the display surface P, the speaker 23, and the processing devices 28, 36 for controlling the first communication device 25, the projector 30, and the speaker 23. The processing devices 28, 36 change the layout in accordance with the type of the image and the speaker when displaying the projection image SG in which the images different in type are mixed, on the display surface P on which the conference camera 40 is arranged. Thus, it is possible to improve the visibility of the projection image SG, and at the same time, it is possible to help understanding of the content of the projection image SG. Therefore, it is possible to display the projection image SG with an improved layout compared to, for example, the layout in which a single image is displayed at the center at a large size irrespective of the type of the image.

Further, the display system 10 according to the embodiment makes the size of the presentation image SP during the utterance M2 by the user U3 larger than the size of the presentation image SP during the utterance M1 by the user U1. Thus, it is possible to improve the visibility of the presentation image SP displayed on the display surface P, and thus, it is possible to help the utterance, namely the presentation, by the user U3.

Further, the display system 10 according to the embodiment displays the image S1 representing the user U1 at the position closer to the position of the conference camera 40 than the position at which the presentation image SP is displayed during the period in which the sound by the user U1 is output. Further, in the display method according to the embodiment, the images S3, S4 obtained by the conference camera 40 during the period in which the sound by the user U1 is output are transmitted to the terminal device T1 used by the user U1. In general, since the users U3, U4 viewing the display surface P gaze on the image S1 representing the user U1 in the period in which the sound by the user U1 is output, by arranging the image S1 at such a position as described above, the gazes of the users U3, U4 are turned on the vicinity of the conference camera 40. Therefore, the user U1 having received the transmission of the taken image SK of the conference camera 40 recognizes that the gazes of the users U3, U4 are directed to a position close to him- or herself, and it is possible to reduce the uncomfortable feeling caused by the misalignment of the gazes.

Further, the program according to the embodiment changes the layout in accordance with the type of the image and the speaker when displaying the projection image SG in which the images different in type are mixed, on the display surface P on which the conference camera 40 is arranged. Thus, it is possible to improve the visibility of the projection image SG, and at the same time, it is possible to help understanding of the content of the projection image SG. Therefore, it is possible to display the projection image SG with an improved layout compared to, for example, the layout in which a single image is displayed at the center at a large size irrespective of the type of the image.

Further, the program according to the embodiment makes the size of the presentation image SP during the utterance M2 by the user U3 larger than the size of the presentation image SP during the utterance M1 by the user U1. Thus, it is possible to improve the visibility of the presentation image SP displayed on the display surface P, and thus, it is possible to help the utterance, namely the presentation, by the user U3.

Further, the program according to the embodiment displays the image S1 representing the user U1 at the position closer to the position of the conference camera 40 than the position at which the presentation image SP is displayed during the period in which the sound by the user U1 is output. Further, in the display method according to the embodiment, the images S3, S4 obtained by the conference camera 40 during the period in which the sound by the user U1 is output are transmitted to the terminal device T1 used by the user U1. In general, since the users U3, U4 viewing the display surface P gaze on the image S1 representing the user U1 in the period in which the sound by the user U1 is output, by arranging the image S1 at such a position as described above, the gazes of the users U3, U4 are turned on the vicinity of the conference camera 40. Therefore, the user U1 having received the transmission of the taken image SK of the conference camera 40 recognizes that the gazes of the users U3, U4 are directed to a position close to him- or herself, and it is possible to reduce the uncomfortable feeling caused by the misalignment of the gazes.

G: Modified Examples

Some aspects of modifications in the embodiment described above will hereinafter be described. It is also possible to arbitrarily combine two or more aspects arbitrarily selected from the following aspects of the modifications with each other within a range in which the aspects do not conflict with each other.

G1: Modified Example 1

In the present embodiment, there is described when the online conference is held between the display system 10 and the terminal devices T1, T2. Besides the above, it is possible to hold the online conference between, for example, the display system 10 and an other display system. In this case, a reference layout of a projection image SG and a layout of the projection image SG during an utterance in the other display system are determined based on an arrangement of a conference camera in the other display system.

G2: Modified Example 2

At least a part of the processing of the functional units to be executed by the processing device 28 of the personal computer 20 can be executed by the processing device 36 of the projector 30, a processing device of the conference camera 40, or a processing device of the conference server C. Further, at least a part of the processing of the functional units to be executed by the processing device 36 of the projector 30 can be executed by the processing device 28 of the personal computer 20, the processing device of the conference camera 40, or the processing device of the conference server C. For example, when performing multi-projection of projecting an image on a huge screen using a plurality of projectors 30, it is effective to generate the projection image SG in the conference server C. In this case, the conference server C divides the projection image SG into the projection areas of the respective projectors 30, and then transmits the image data corresponding to the projection image SG thus divided to the respective projectors 30.

G3: Modified Example 3

In the present embodiment, the display system 10 is provided with the personal computer 20, the projector 30, and the conference camera 40. Besides the above, it is possible for the projector 30 to be provided with the functions of the personal computer 20. In this case, the projector 30 is made connectable to the network N, and at the same time, made capable of obtaining the taken image of the conference camera 40.

G4: Modified Example 4

In the present embodiment, it is assumed that the images S3, S4 representing the users U3, U4 at the site K3 are displayed in the projection image SG. Besides the above, it is possible to arrange that the images S3, S4 representing the users U3, U4 at the site K3 are not displayed in the projection image SG. This is because the users U3, U4 located at the site K3 can visually observe each other's face. Further, by hiding the images S3, S4, it is possible to increase the projection areas of other images in the projection image SG.

Further, in the present embodiment, the partial images SB1, SB2 are generated from the taken image SK of the conference camera 40, and then the image S3 representing the user U3 and the image S4 representing the user U4 are generated. Besides the above, the taken image SK in which the plurality of users U3, U4 shows can directly be displayed in the projection image SG as an image representing the site K3.

G5: Modified Example 5

In the present embodiment, the projector 30 is an example of the display device. Besides the above, it is possible to use, for example, at least one flat panel display as the display device. For example, it is possible to arrange a plurality of flat panel displays side by side on the same plane, and then arrange the conference camera 40 in a gap between the flat panel displays. Further, for example, it is possible to arrange the conference camera 40 on a surface of the flat panel display.

What is claimed is:

1. A display method comprising:
   obtaining information representing a position on a display surface of a camera which is arranged on the display surface to image a first user;
   displaying a first image representing a content of an utterance by the first user, a second image which represents a second user and a third image which represents the first user, the second image larger than the first image, larger than the third image, not overlapping with the first image and being arranged at a position closer to the position of the camera than a position of the first image is to the position of the camera, on the display surface during a period in which the second user makes an utterance;
   transmitting an image obtained by the camera during the period in which the second user makes the utterance, to a terminal device used by the second user; and
   displaying, on the display surface during a period in which the first user makes an utterance, the first image larger than the second image, larger than the third image, and larger than the first image during the period in which the second user makes the utterance, wherein
   on the display surface during the period in which the second user makes an utterance, the second image, while not overlapping with the first image, is made larger than the second image during the period in which the first user makes an utterance and is made larger than the third image.

2. The display method according to claim 1, wherein
   the displaying the first image during the period in which the first user makes the utterance includes displaying the first image at a position closer to the position of the camera than the position of the first image during the period in which the second user makes the utterance, and
   the display method further comprises transmitting an image obtained by the camera during the period in which the first user makes the utterance, to the terminal device used by the second user.

3. The display method according to claim 1, wherein
   the displaying the second image during the period in which the second user makes the utterance includes displaying the second image at a position overlapping the camera on the display surface.

4. The display method according to claim 3, wherein
   the second image is an image obtained by imaging a range including a face of the second user, and
   a portion overlapping a range in which the camera is arranged out of the second image is a portion other than the face of the second user.

5. The display method according to claim 3, wherein the displaying the second image during the period in which the second user makes the utterance includes displaying a portion of the second image overlapping the range in which the camera is arranged with a luminance lower than a luminance of other portions of the second image.

6. The display method according to claim 1, wherein the displaying the first image and the second image during the period in which the first user makes the utterance includes displaying the first image and the second image on the display surface at positions other than a position overlapping a range in which the camera is arranged.

7. A display system comprising:

at least one communication interface which communicates with a camera which is arranged on a display surface and which images a first user, and a terminal device used by a second user;

a display device which displays an image on the display surface;

a speaker; and at least one processing device which controls the communication interface, the display device, and the speaker, wherein the at least one processing device obtains information representing a position of the camera on the display surface, displays a first image representing a content of an utterance by the first user, a second image which represents the second user and a third image which represents the first user, the second image larger than the first image, larger than the third image, not overlapping with the first image and being arranged at a position closer to the position of the camera than a position of the first image is to the position of the camera, on the display surface, with the display device, during a period in which the second user makes an utterance, transmits an image obtained by the camera during the period in which the second user makes the utterance, to the terminal device via the communication interface, and displays, on the display surface, using the display device, during a period in which the first user makes an utterance, the first image larger than the second image, larger than the third image, and larger than the first image during the period in which the second user makes the utterance, and on the display surface during the period in which the second user makes an utterance, the second image, while not overlapping with the first image, is made larger than the second image during the period in which the first user makes an utterance and is made larger than the third image.

8. A non-transitory computer-readable storage medium storing a program for making a computer execute a method comprising:

obtaining information representing a position on a display surface of a camera which is arranged on the display surface to image a first user;

displaying a first image representing a content of an utterance by the first user, a second image which represents a second user and a third image which represents the first user, the second image larger than the first image, larger than the third image, not overlapping with the first image and being arranged at a position closer to the position of the camera than a position of the first image is to the position of the camera, on the display surface during a period in which the second user makes an utterance;

transmitting an image obtained by the camera during the period in which the second user makes the utterance, to a terminal device used by the second user; and displaying, on the display surface during a period in which the first user makes an utterance, the first image larger than the second image, larger than the third image, and larger than the first image during the period in which the second user makes the utterance, wherein on the display surface during the period in which the second user makes an utterance, the second image, while not overlapping with the first image, is made larger than the second image during the period in which the first user makes an utterance and is made larger than the third image.

* * * * *